United States Patent
Yamada (10) Patent No.: US 9,230,073 B2
(45) Date of Patent: Jan. 5, 2016

(54) INFORMATION PROCESSING APPARATUS, CONTROL METHOD THEREFOR, AND STORAGE MEDIUM STORING PROGRAM

(75) Inventor: Tetsuya Yamada, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 34 days.

(21) Appl. No.: 13/528,970

(22) Filed: Jun. 21, 2012

(65) Prior Publication Data

US 2012/0327465 A1 Dec. 27, 2012

(30) Foreign Application Priority Data

Jun. 22, 2011 (JP) ................. 2011-138893

(51) Int. Cl.
| | | |
|---|---|---|
| *G06K 15/00* | (2006.01) | |
| *G06F 21/30* | (2013.01) | |
| *G06F 21/45* | (2013.01) | |
| *G06F 21/60* | (2013.01) | |

(52) U.S. Cl.
CPC .............. *G06F 21/305* (2013.01); *G06F 21/45* (2013.01); *G06F 21/608* (2013.01); *G06F 2221/2117* (2013.01); *G06F 2221/2141* (2013.01); *G06F 2221/2145* (2013.01)

(58) Field of Classification Search
CPC ............ H04L 67/1002; H04L 41/0893; H04L 29/12009; H04L 29/2132; H04N 1/00344
USPC .................. 358/1.15, 448, 1.14, 403, 401
See application file for complete search history.

(56) References Cited

U.S. PATENT DOCUMENTS

| 7,801,755 | B2 * | 9/2010 | Doherty et al. ............... 705/7.13 |
| 8,386,785 | B2 * | 2/2013 | Kim et al. ..................... 713/175 |
| 2002/0042721 | A1 * | 4/2002 | Tillmanns ......................... 705/1 |
| 2003/0005061 | A1 | 1/2003 | Inagaki et al. |
| 2006/0050303 | A1 | 3/2006 | Oomori et al. |
| 2009/0319796 | A1 * | 12/2009 | Kim et al. ..................... 713/176 |
| 2010/0014652 | A1 * | 1/2010 | Yasuda ........................ 379/196 |
| 2011/0145114 | A1 * | 6/2011 | Purdy et al. .................... 705/34 |
| 2011/0302242 | A1 * | 12/2011 | Kim et al. ..................... 709/203 |
| 2012/0158336 | A1 * | 6/2012 | Duchamp et al. ............... 702/81 |

FOREIGN PATENT DOCUMENTS

| JP | 2003016004 A | 1/2003 |
| JP | 2006-101484 A | 4/2006 |
| JP | 2007088944 A | 4/2007 |
| JP | 2009141686 A | 6/2009 |
| JP | 2010092300 A | 4/2010 |
| JP | 2011071887 A | 4/2011 |

OTHER PUBLICATIONS

Japanese Office Action issued in Japanese counterpart application No. JP2011-138893, dated Jun. 5, 2015.
Office Action issued in JP2011-138893, mailed Sep. 24, 2015. English translation provided.

\* cited by examiner

*Primary Examiner* — Jerome Grant, II
(74) *Attorney, Agent, or Firm* — Rossi, Kimms & McDowell LLP

(57) ABSTRACT

The invention acquires a destination corresponding to a group to which an authenticated user belongs by searching a user management unit configured to manage a plurality of destinations respectively corresponding to a plurality of users and information of a group to which each of the plurality of users belongs, and sets to transmit data to the acquired destination.

12 Claims, 8 Drawing Sheets

| LOGIN NAME | DOMAIN NAME | PASSWORD | DISPLAY NAME | E-MAIL | GROUP 1 | GROUP 2 |
|---|---|---|---|---|---|---|
| mizuno | abc.com | *** | 水野 | mizuno@abc.com | DEVELOPMENT SECTION 1 | \\svr\dev 1 |
| uruma | abc.com | *** | 閏間 | uruma@abc.com | DEVELOPMENT SECTION 2 | \\svr\dev 2 |
| yamada | abc.com | *** | 山田 | yamada@abc.com | DEVELOPMENT SECTION 1 | \\svr\dev 1 |

| ATTRIBUTE ID | ATTRIBUTE TYPE ID | AUTHENTICATION DESTINATION | ENTRY | TRANSMISSION ATTRIBUTE | SEARCH CONDITION |
|---|---|---|---|---|---|
| 1 | 1 | LOCAL | — | E-MAIL | USERS HAVING SAME VALUE OF GROUP 1 |
| 2 | 1 | LDAP | CN | mail | ALL USERS BELONGING TO SAME ENTRY OF OU |
| 3 | 2 | LDAP | OU | homeDirectory | FOLDER CORRESPONDING TO SAME ENTRY OF OU |

FIG. 8

INFORMATION PROCESSING APPARATUS, CONTROL METHOD THEREFOR, AND STORAGE MEDIUM STORING PROGRAM

BACKGROUND OF THE INVENTION

1. Field of the Invention

The present invention relates to an information processing apparatus for executing an application designated by an authenticated user, a control method therefor, and a storage medium storing a program.

2. Description of the Related Art

An information processing apparatus is known which includes a user authentication apparatus, and provides an application dedicated to an authenticated user. Japanese Patent Laid-Open No. 2006-101484 describes an image transmission apparatus for transmitting read image data to the e-mail address of an authenticated user. This document also describes a button for automatically setting the e-mail address of the authenticated user as a transmission address.

The above-described conventional technique, however, cannot transmit data by automatically setting the addresses of the members of a group (for example, a section) to which the authenticated user belongs.

SUMMARY OF THE INVENTION

An aspect of the present invention is to eliminate the above-mentioned problems with the conventional technology.

The present invention provides an information processing apparatus which can transmit data to a group to which an authenticated user belongs, a control method therefor, and a storage medium storing a program.

The present invention in its first aspect provides an information processing apparatus comprising: a user management unit configured to manage a plurality of destinations respectively corresponding to a plurality of users and information of a group to which each of the plurality of users belongs; an acquisition unit configured to acquire a destination corresponding to a group to which an authenticated user belongs by searching the user management unit; and a setting unit configured to set to transmit data to the destination acquired by the acquisition unit.

The present invention in its second aspect provides a control method of controlling an information processing apparatus, comprising: an acquisition step of acquiring a destination corresponding to a group to which an authenticated user belongs by searching a user management unit configured to manage a plurality of destinations respectively corresponding to a plurality of users and information of a group to which each of the plurality of users belongs; and a setting step of setting to transmit data to the destination acquired in the acquisition step.

The present invention in its third aspect provides a computer-readable storage medium storing a program for causing a computer to execute an acquisition step of acquiring a destination corresponding to a group to which an authenticated user belongs by searching a user management unit configured to manage a plurality of destinations respectively corresponding to a plurality of users and information of a group to which each of the plurality of users belongs, and a setting step of setting to transmit data to the destination acquired in the acquisition step.

According to the present invention, it is possible to transmit data by setting, as a destination, the group to which the authenticated user belongs.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components, and a repetitive description thereof will be omitted.

As an information processing apparatus according to the present invention, a multi function peripheral (MFP) which includes an image reading function, a print function, and a communication function, and has an image processing application such as an application of transmitting a copied, printed, or scanned image will be exemplified below. The information processing apparatus of the present invention, however, is not limited to such an MFP.

Figure 1:
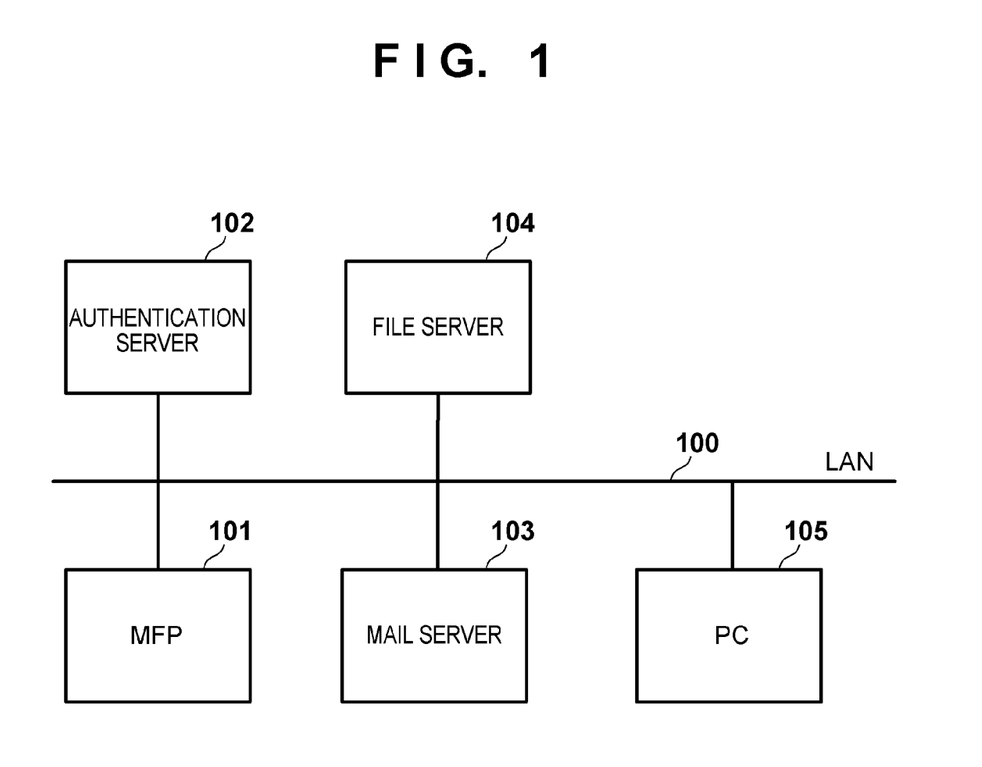
FIG. 1 is a block diagram showing the whole system including a multi function peripheral (MFP) according to an embodiment.

FIG. 1 is a block diagram showing the whole system including a multi function peripheral (MFP) 101 according to an embodiment.

An authentication server 102 is a server for managing user information, which is implemented by, for example, an LDAP server. A mail server 103 is used to transmit e-mail from the MFP to a PC 105. A file server 104 is used as a transmission destination of a document from the MFP 101. The MFP 101, servers 102 to 104, and PC 105 are connected through a LAN 100.

Figure 2:
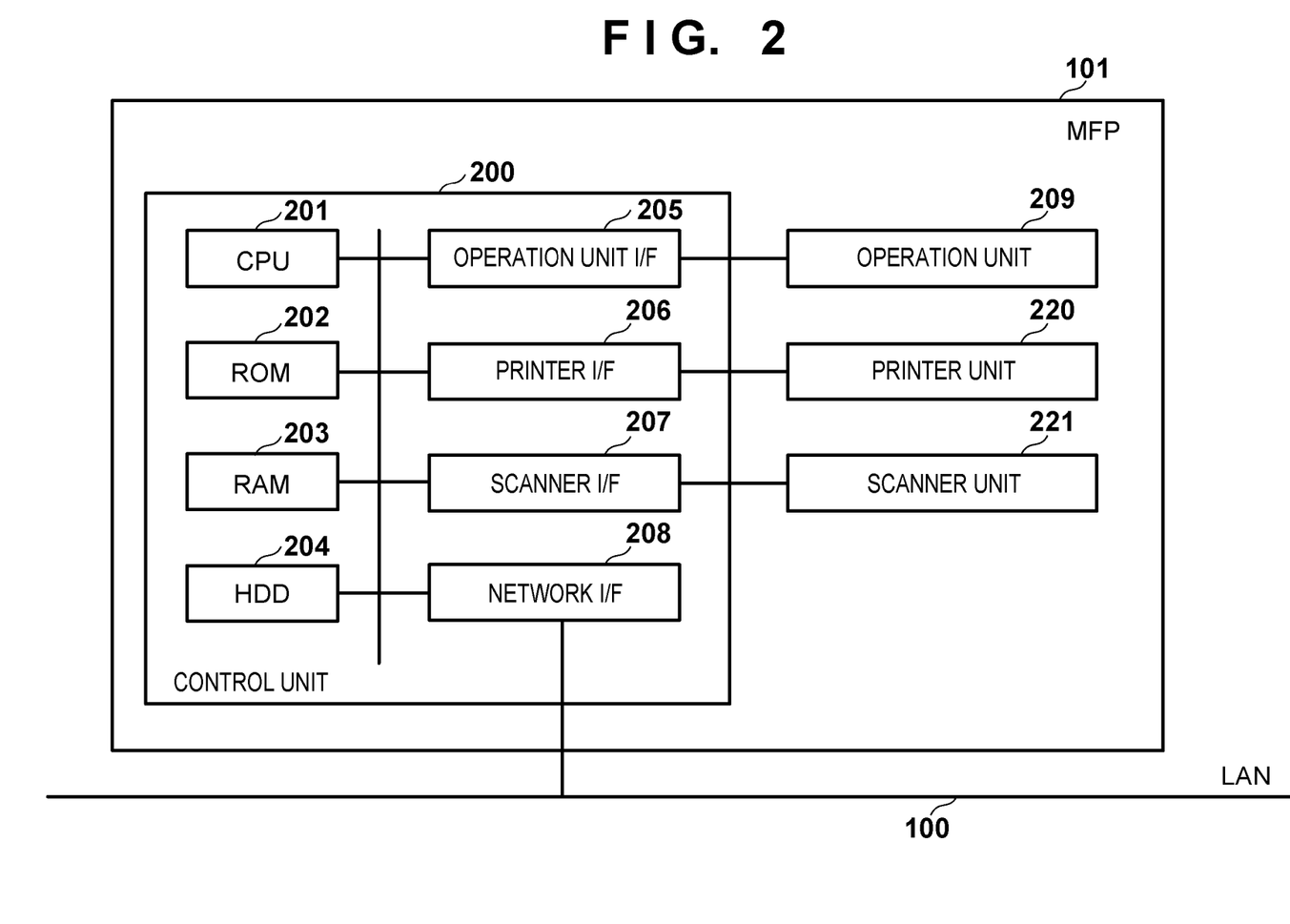
FIG. 2 is a block diagram showing the configuration of the multi function peripheral (MFP) according to the embodiment.

FIG. 2 is a block diagram showing the configuration of the multi function peripheral (MFP) 101 according to the embodiment.

A control unit 200 including a CPU 201 controls the operation of the MFP 101 as a whole. The CPU 201 performs various control operations such as a read control operation and a transmission control operation by reading out control programs stored in a ROM 202. A RAM 203 is used as a main memory for the CPU 201 and as a temporary storage area such as a work area. An HDD (Hard Disk Drive) 204 stores image data and various kinds of programs, or various kinds of information tables (to be described later). An operation unit I/F 205 connects an operation unit 209 with the control unit 200. A printer I/F 206 connects a printer unit 220 with the control unit 200. Image data to be printed by the printer unit 220 is transferred from the control unit 200 via the printer I/F 206, and is printed on a storage medium (sheet) by the printer unit 220. A scanner I/F 207 connects a scanner unit 221 with the control unit 200. The scanner unit 221 reads an image on a document to generate image data, and inputs the generated image data to the control unit 200 via the scanner I/F 207. A network I/F 208 connects the control unit 200 (MFP 101) to the LAN 100. The network I/F 208 transmits image data and information to an external apparatus (for example, the PC 105) on the LAN 100, and receives various kinds of information from an external apparatus on the LAN 100.

Figure 3:
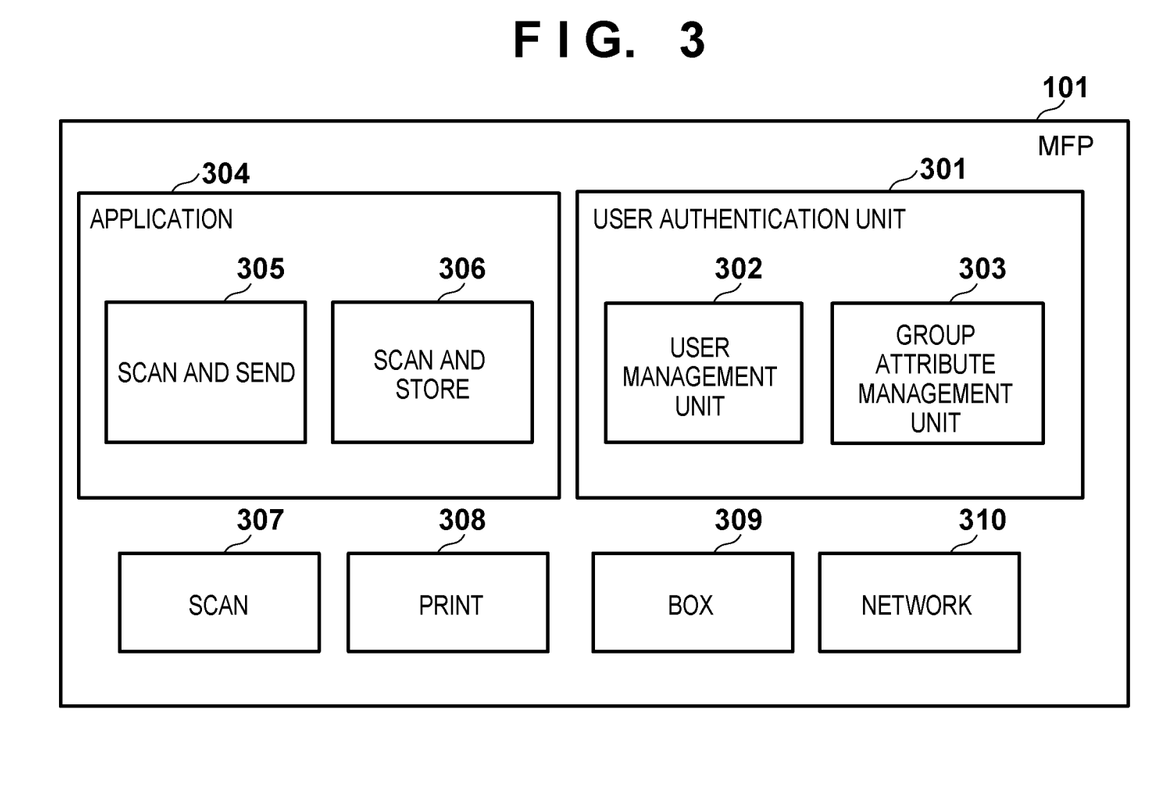
FIG. 3 is a block diagram for explaining the software configuration of the MFP according to the embodiment.

FIG. 3 is a block diagram for explaining the software configuration of the MFP 101 according to the embodiment.

Figure 5:
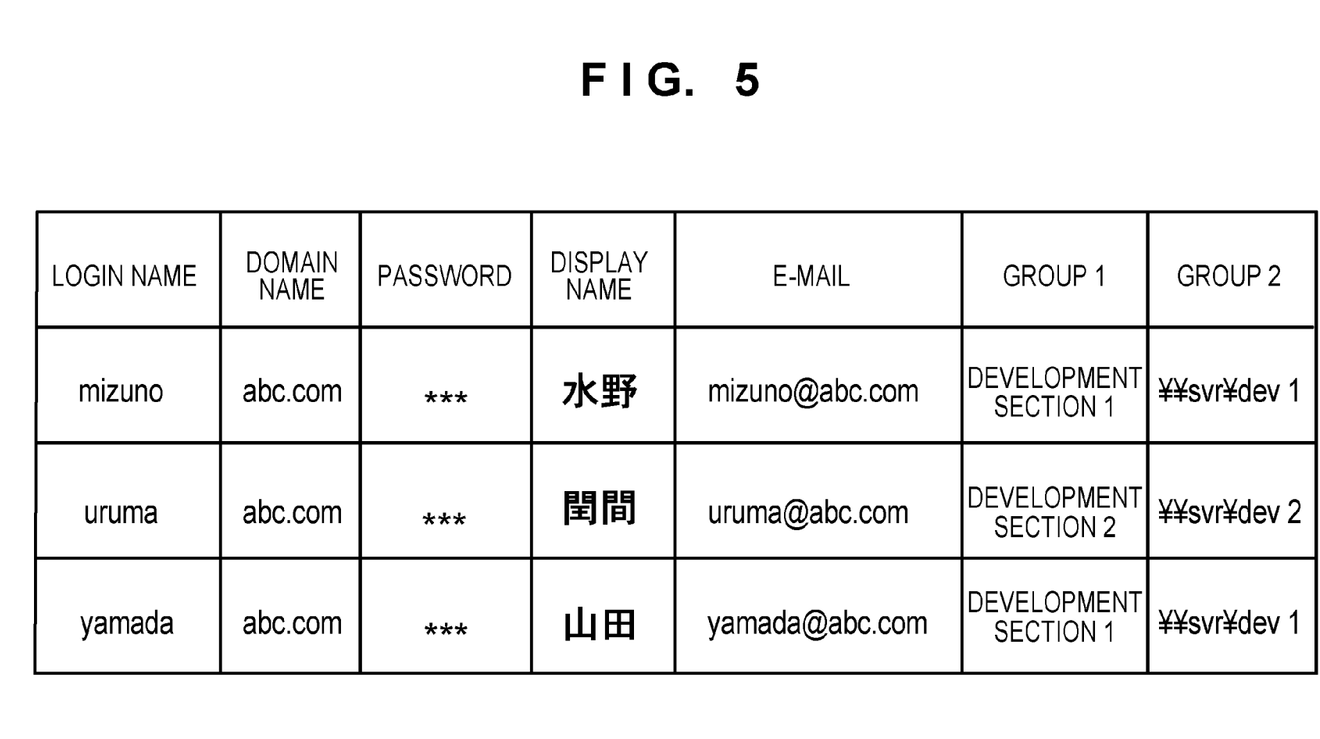
FIG. 5 is a table showing an example of user management information.

A user authentication unit 301 authenticates a user who uses the MFP 101. If user information is managed within the MFP 101, a user management unit 302 is used. The user management unit 302 manages, as attributes, a login name, a domain name, a password, a display name, an e-mail address, and two pieces of group information for each user, as shown in FIG. 5. The group information is arbitrarily settable in an environment where the MFP 101 is operated. A section to which each user belongs is set as the first group (group 1), and the common folder of the section is set as the second group (group 2). It is also possible to perform single sign-on using the external authentication server 102.

FIG. 5 is a table showing an example of the user management information. FIG. 5 shows the management information of a plurality of users (three users) "Mizuno", "Uruma", and "Yamada". Note that referring to FIG. 5, "group 2" indicates the common folder of a section to which each user belongs.

Figure 6:
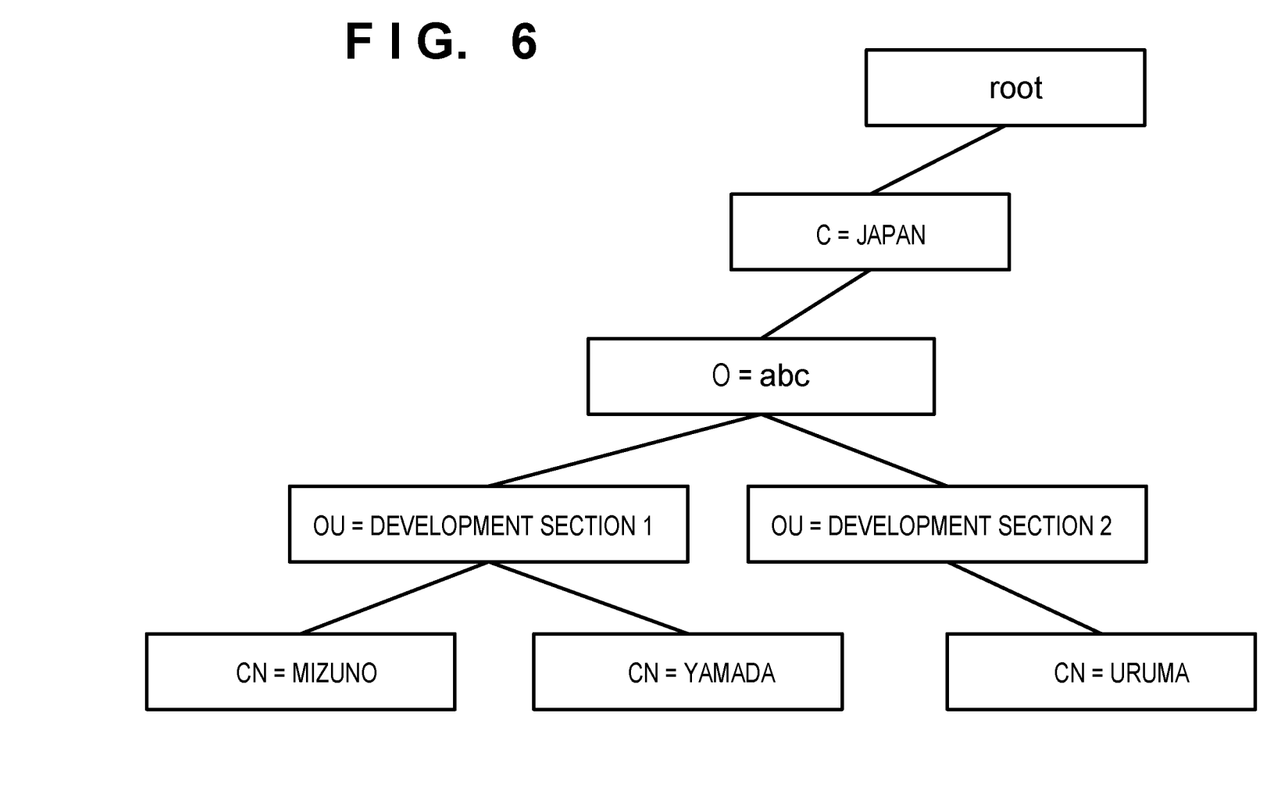
FIG. 6 is a view showing a case in which an authentication server as an example of an LDAP server performs management similar to user management exemplified in FIG. 5.

FIG. 6 is a view showing a case in which the authentication server 102 as an example of the LDAP server performs management similar to the user management exemplified in FIG. 5.

The authentication server 102 manages users using a hierarchical structure called DIT (Directory Information Tree). As shown in FIG. 6, the hierarchy is formed by, from the top, a root, C (Country: a country), O (Organization: an organization/company), OU (Organization Unit: a sub organization such as a department and section), and CN (Canonical Name: a proper name). There are entries in each layer.

In this embodiment, each entry in the layer OU indicates a section ("development section 1" or "development section 2" in FIG. 6) to which each user belongs. Each entry in the layer CN indicates each user name. Note that each entry has various kinds of attribute information.

In this embodiment, the attribute information of each entry in the layer OU includes a section name and the home directory of the section. The attribute information of each entry in the layer CN includes a user ID, a user name, a home directory, and an e-mail address. A group attribute management unit 303 in FIG. 3 manages, for example, the definition of each group and the attributes of the user information managed by the user management unit 302.

An application 304 includes a "scan and send" application 305 and a "scan and store" application 306. The "scan and send" application 305 transmits scanned image data to a PC or file server by e-mail or faxes the scanned image data. The "scan and store" application 306 stores, in the HDD 204, image data obtained by scanning a document.

Scan software 307, print software 308, box software 309, and network software 310 implement the basic functions of the MFP 101. The scan software 307 corresponds to a scan function. The print software 308 corresponds to a print function. The box software 309 corresponds to a box function of storing image data. And the network software 310 corresponds to a function of transmitting/receiving image data via the LAN 100.

In this embodiment, assume that when the "scan and send" application 305 is instructed, "send to section members" or "send to section folder" is designated as a destination. When the user selects the "scan and send" application 305 as an application to be used, a screen shown in FIG. 4 is displayed.

Figure 4:
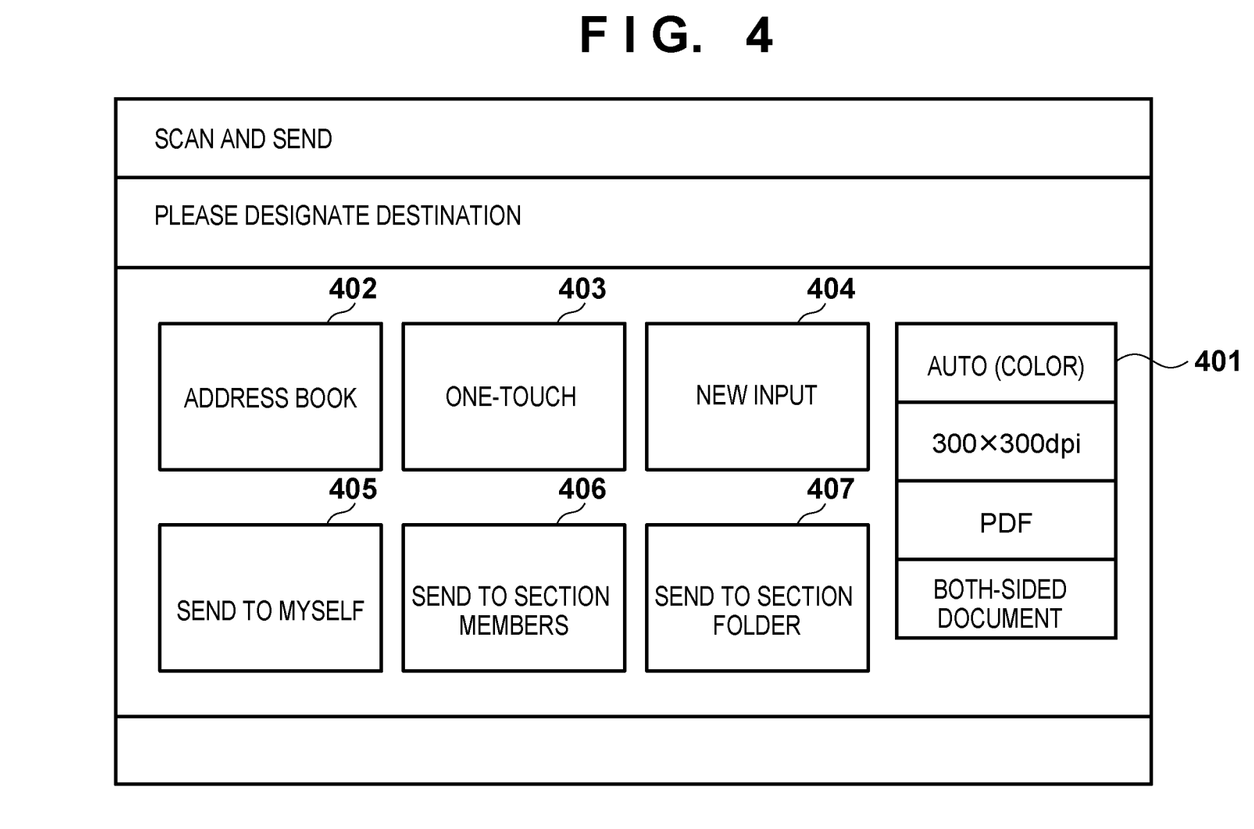
FIG. 4 is a view showing an example of a screen displayed on an operation unit when "scan and send" is instructed.

FIG. 4 is a view showing an example of a screen displayed on the operation unit 209 when the "scan and send" application 305 is instructed. This display control operation is performed when the CPU 201 executes a program stored in the ROM 202.

Value 401 denotes scan setting values, according to which whether a document is a color or monochrome document is automatically determined, a resolution is 300×300 dpi, an output format is PDF, and a both-sided document is set. Buttons 402 to 407 are associated with setting of a destination of scanned image data. Upon pressing the "address book" button 402, an address book is displayed, and the user selects a desired one from destinations registered in the address book. Upon pressing the "one-touch" button 403, a group of buttons for which the user has set destinations in advance is displayed. Upon pressing the "new input" button 404, a screen to newly input a destination is displayed. Upon pressing the "send to myself" button 405, e-mail to which image data obtained by a scan operation has been attached as an attachment is transmitted to an e-mail address managed in association with the authenticated user. Upon pressing the "send to section members" button 406, the members of the section to which the authenticated user belongs are set as destinations, and e-mail to which image data obtained by a scan operation has been attached is transmitted. Upon pressing the "send to section folder" button 407, a file is generated based on image data obtained by a scan operation, and is then transmitted to and stored in the common folder of the section to which the authenticated user belongs.

The group attribute management unit 303 manages, in association with each other, attributes which the application 304 wants to use and the actual attributes of the user information of the user management unit 302, which are used and managed by the user authentication unit 301. For example, the unit 303 manages, as user management, how "section", "section members", and "e-mail addresses of section members" are associated with each other in the "send to section members" function of the "scan and send" application.

Figure 7:
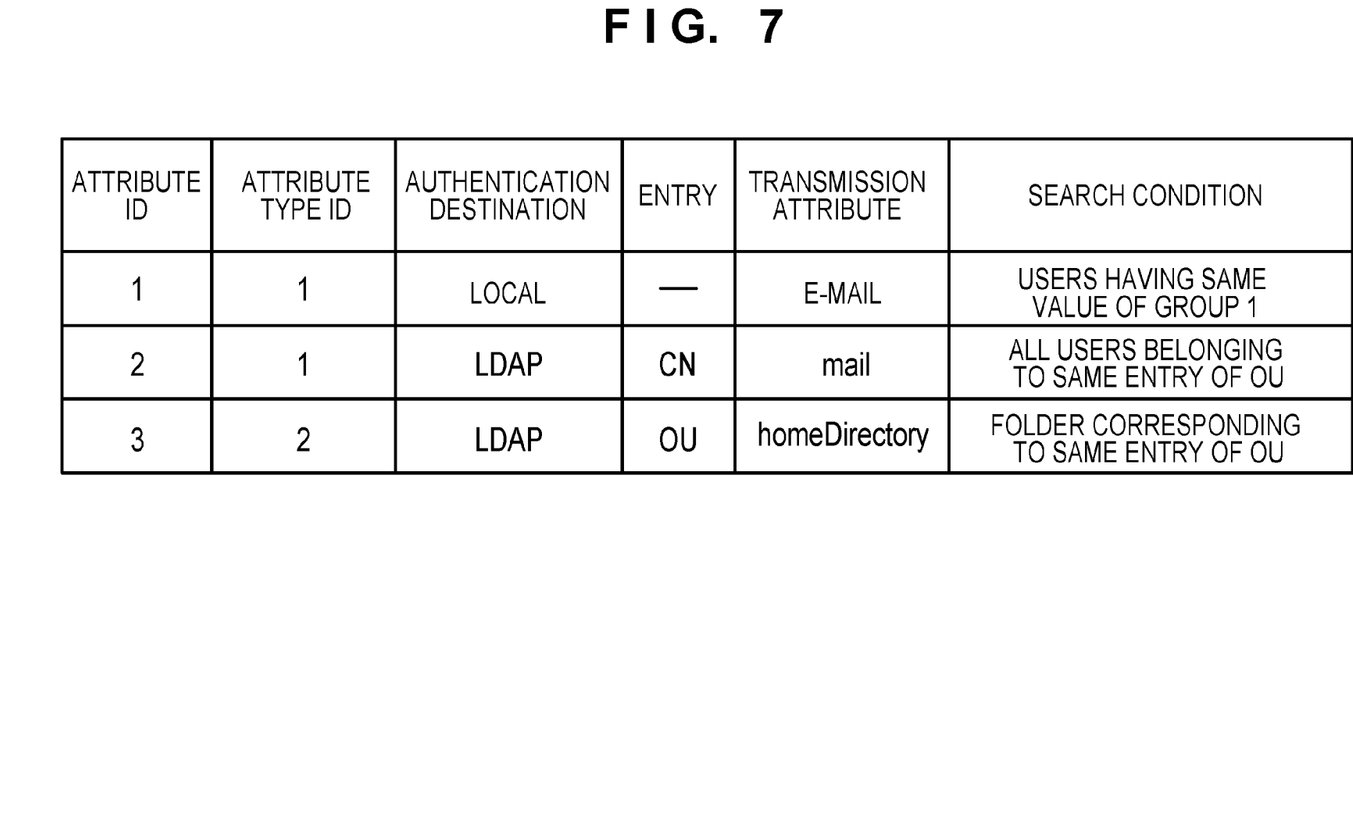
FIG. 7 is a table showing an example of a management table managed by a group attribute management unit.

FIG. 7 is a table showing an example of a management table managed by the group attribute management unit 303.

An attribute ID is an identifier (ID) used to manage attributes. An attribute type ID indicates the type of destination attribute for the application 304, in which "1" represents "send to section members" and "2" represents "send to section folder". The application 304 manages this association. An authentication destination indicates the location of user information to be used by the user authentication unit 301, in which "local" represents the user management unit 302 and "LDAP" represents the authentication server 102. An entry indicates the layer of an entry in the authentication server 102 where there exist attribute values to be used by the application 304. If, therefore, the authentication destination is "local", no entry exists. Alternatively, if the authentication destination is "LDAP" and "send to section members" (ID=1) is designated, users in the layer CN who belong to the same section of the layer OU as that of the authenticated user are set as destination targets. If the authentication destination is "LDAP" and "send to section folder" (ID=2) is designated, the home directory of the same section of the layer OU as that of the authenticated user is set as a destination target. A transmission attribute indicates the name of a transmission attribute, to be used by the application 304, of the transmission attributes of entries to be used. In this example, "e-mail", "mail", and "home directory" are included. A search condition indicates all users who belong to the same section of group 1 as that of the authenticated user when the authentication destination is "local" and "send to section members" is designated. Alternatively, assume that the authentication destination is the authentication server 102. In this case, if "send to section members" is designated, the search condition indicates members who belong to the same section of the layer OU (group) as that of the authenticated user. If "send to section folder" is designated, the search condition indicates a common folder of the same section of the layer OU (group) as that of the authenticated user.

If the attribute ID is "1", the application uses "group 1" (development section) of the attributes of the user information which is shown in the example of FIG. 5 and is managed by the user management unit 302. If the attribute ID is "2", all CN entries which belong to the same OU entry as that to which the user authenticated by the authentication server 102 belongs (the higher entry of the authenticated user) are the members of the same section, and the mail addresses of the entries are used as e-mail addresses. In the example of FIG. 6, if the authenticated user is "Yamada", "Mizuno" belonging to the same OU entry as that of "Yamada" is found, the e-mail addresses of "Yamada" and "Mizuno" are specified as e-mail destinations. If the attribute ID is "3", a path or URL specified by the transmission attribute (home directory) of the entry of the layer OU to which the user authenticated by the authentication server belongs is specified.

Figure 8:
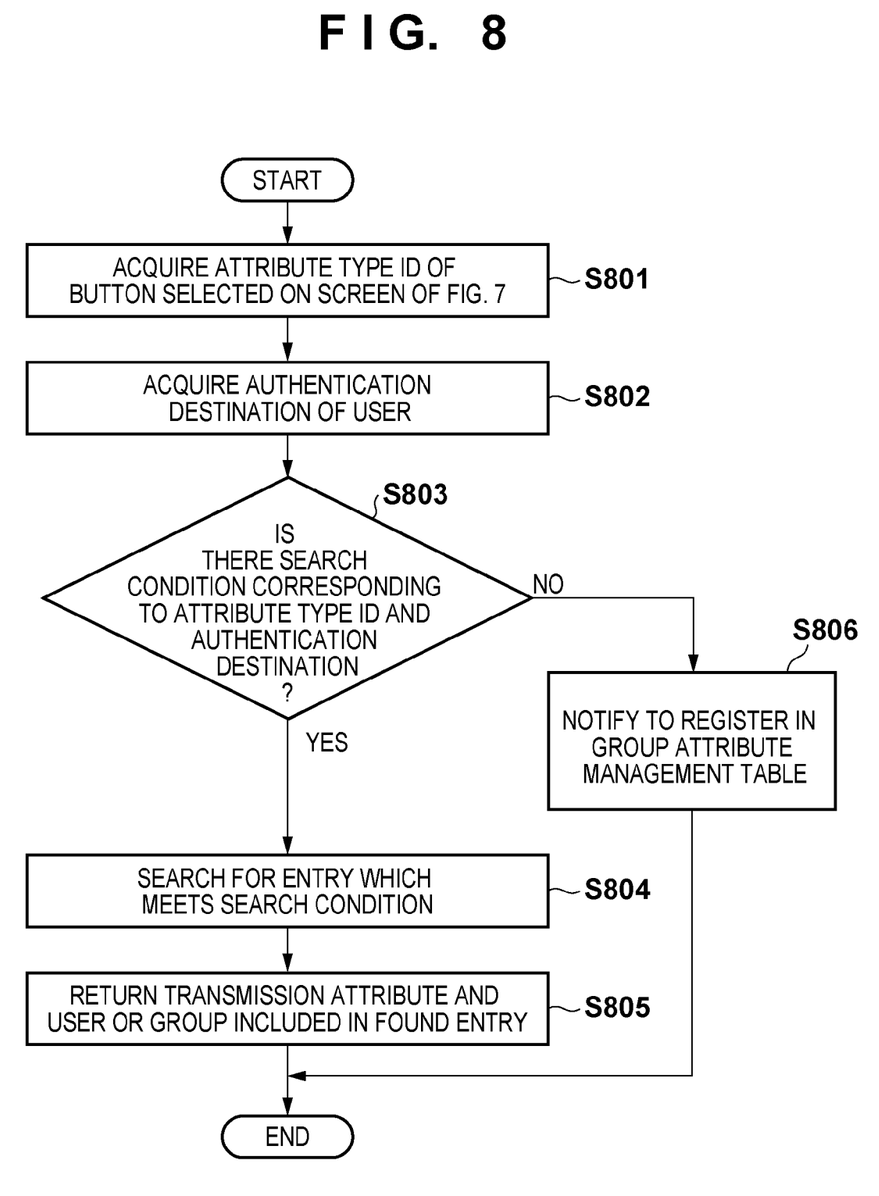
FIG. 8 is a flowchart for explaining processing from when the group attribute management unit receives a "scan and send" request until it returns attributes.

FIG. 8 is a flowchart for explaining processing from when the group attribute management unit 303 receives a "scan and send" request until it returns a user list and its transmission attributes. Note that a program for executing this processing is stored in the ROM 202, and is executed under control of the CPU 201.

In step S801, when the "scan and send" application 305 of the application 304 is instructed, the "send to section members" button 406 or "send to section folder" button 407 of FIG. 4 is pressed according to a designated destination. An attribute type ID corresponding to the thus selected button is designated to send an attribute value acquisition request to the group attribute management unit 303. Note that "1" is designated for "send to section members" and "2" is designated for "send to section folder".

The process advances to step S802 to inquire about the authentication destination of a user currently authenticated for the user authentication unit 301, and authentication destination information is acquired from the user authentication unit 301.

The process advances to step S803 to check using the attribute type ID designated by the application 304 whether there is a search condition corresponding to the current authentication destination in the management table (FIG. 7) of the group attribute management unit 303. If there is no search condition, the process advances to step S806 to notify the application 304 that registration in the group attribute management unit 303 is necessary, and the process ends.

On the other hand, if there is a search condition, the process advances to step S804 to search for an entry which meets the search condition of the management table shown in FIG. 7. Then, the transmission attribute and the user name or group of the entry which meets the search condition are acquired. After that, the process advances to step S805, and the transmission attribute and user name or group acquired in step S804 are returned to the application 304.

A practical example will be described. If a user which has been authenticated by the authentication server 102 selects the "send to section members" button 406 of FIG. 4, the application 304 designates "LDAP" as an authentication destination, and "1", that is, "send to section members" as an attribute type ID. As a result, "all users belonging to the same entry of the layer OU as that of the authenticated user" is selected as a search condition. In step S804, a user in the layer CN belonging to the same entry of the layer OU as that of the authenticated user, and the transmission attribute ("mail" in this case) of the user are stored in the RAM 203 or the HDD 204 in association with the "send to section members" button 406 of FIG. 4.

On the other hand, if the user authenticated by the authentication server 102 designates the "send to section folder" button 407 of FIG. 4, the application 304 designates "LDAP" as an authentication destination, and "2", that is, "send to section folder" as an attribute type ID. As a result, "a folder corresponding to the same entry of the layer OU as that of the authenticated user" is selected as a search condition. In step S804, the same group as the entry of the layer OU of the user and the transmission attribute ("home directory" (the path or URL of the folder) in this case) are stored in the RAM 203 or the HDD 204 in association with the "send to section members" button 406 of FIG. 4.

The authenticated user presses the "send to section members" button 406 on the screen of FIG. 4. With this operation, it is possible to transmit e-mail by setting, as destinations, the e-mail addresses returned in step S804, that is, the e-mail addresses of the members of the section to which the authenticated user belongs.

If the authenticated user presses the "send to section folder" button 407 on the screen of FIG. 4, it is possible to execute file transfer by setting, as a destination, the path or URL returned in step S804, that is, the home directory of the section to which the authenticated user belongs. As described above, to scan and send data, it is possible to automatically set a destination and transmission method when the authenticated user only designates the "send to section members" or "send to section folder" button. This eliminates the need to select an address by pressing the "address book" button 402 in order for the authenticated user to designate a destination, thereby significantly reducing the labor of setting an address.

Note that in steps S804 and S805 of the flowchart shown in FIG. 8, the application 304 may acquire the e-mail address of the authenticated user, and store it in the RAM 203 or the HDD 204 in association with the "send to myself" button 405 of FIG. 4. This reduces the authenticated user's labor of transmitting e-mail to himself/herself.

In FIG. 6, the attribute information of each entry of the layer OU may include the address of the mailing list of the section. For the attribute ID "2" ("send to section folder") of FIG. 7, "OU" is set as an entry and "same entry of OU" is set as a search condition. Then, if the "send to section members" button 406 of FIG. 4 is pressed, it is possible to transmit e-mail by setting, as a destination, the mailing list of the section to which the authenticated user belongs.

According to this embodiment, there is provided a user management table for managing the e-mail address of each user and information of a group (the first or second group in FIG. 5) to which each user belongs. Furthermore, "send to section members" or "send to section folder" depending on the authentication destination of each user, a layer (a group or individual user) to be referred to, an entry, and a search condition are registered as a management table. A search condition is obtained from the management table based on the authentication destination of the authenticated user and the destination of "scan and send" selected by the user, and a user or group included in an entry which meets the search condition is obtained, thereby transmitting e-mail or transferring a file according to a corresponding transmission attribute. This enables to transmit, to a user or a section to which the user belongs, scanned image data using e-mail or file transfer according to the attributes of a destination of "scan and send" when the authenticated user only designates the destination on the screen.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-138893, filed Jun. 22, 2011, which is hereby incorporated by reference herein in its entirety.

What is claimed is:

1. An information processing apparatus comprising:
   a user management unit configured to manage a plurality of destinations respectively corresponding to a plurality of users and information defining a group to which each of the plurality of users belongs, the group corresponding to the plurality of destinations;
   a user designation unit configured to allow a user of the plurality of users to designate at least one particular group from among a plurality of groups based on attributes of the user's designation as configured by the user management unit, wherein each group of the plurality of groups corresponds to a respective set of destinations, and the particular group corresponds to a particular set of destinations; and
   a transmitting unit configured to transmit, in response to the user's designation of image data to the particular set of destinations according to the user's designation.
2. The apparatus according to claim 1, further comprising:
   an acquisition unit configured to acquire, in response to the user's designation, the particular set of destinations corresponding to the particular group by searching the user management unit; and
   a management unit configured to manage a search condition used when said acquisition unit searches the user management unit,
   wherein said acquisition unit is configured to search the user management unit using the search condition which is managed by said management unit and corresponds to the user.

3. The apparatus according to claim 1, wherein the user management unit is included in said information processing apparatus or an authentication server connected via a network.
4. The apparatus according to claim 1, wherein said user management unit includes a transmission attribute indicating a data transmission method.
5. The apparatus according to claim 2, wherein the search condition includes searching for a destination corresponding to a particular user included in the particular group, or a folder corresponding to the particular group.
6. A control method of controlling an information processing apparatus, comprising:
   a designation step of allowing a user of a plurality of users to designate at least one particular group from among a plurality of groups based on attributes of the user's designation as configured by a user management unit, the user management unit configured to manage a plurality of destinations respectively corresponding to the plurality of users and information defining a group to which each of the plurality of users belongs, the group corresponding to the plurality of destinations, wherein each group of the plurality of groups corresponds to a respective set of destinations, and the particular group corresponds to a particular set of destinations; and
   a transmission step of transmitting, in response to the user's designation, image data to the particular set of destinations according to the user's designation.
7. The method according to claim 6, further comprising:
   an acquisition step of acquiring, in response to the user's designation, the particular set of destinations corresponding to the particular group by searching the user management unit; and
   a management step of managing a search condition used when the user management unit is searched in the acquisition step,
   wherein in the acquisition step, the user management unit is searched using the search condition which is managed in the management step and corresponds to the user.
8. The method according to claim 6, wherein the user management unit is included in the information processing apparatus or an authentication server connected via a network.
9. The method according to claim 7, wherein the management step manages a transmission attribute indicating a data transmission method as the search condition.
10. The method according to claim 7, wherein the search condition includes searching for a destination corresponding to a particular user included in the particular group, or a folder corresponding to the particular group.
11. A non-transitory computer-readable storage medium storing a program for causing a computer to execute:
    a designation step of allowing a user of a plurality of users to designate at least one particular group from among a plurality of groups based on attributes of the user's designation as configured by a user management unit, the user management unit configured to manage a plurality of destinations respectively corresponding to the plurality of users and information defining a group to which each of the plurality of users belongs, the group corresponding to the plurality of destinations, wherein each group of the plurality of groups corresponds to a respective set of destinations, and the particular group corresponds to a particular set of destinations; and
    a transmission step of transmitting, in response to the user's designation, image data to the particular set of destinations according to the user's designation.

12. An information processing apparatus comprising:
a memory device storing a program; and
a processor coupled to the memory device, the processor configured by the program at least to:
manage first information comprising:
- a plurality of destinations respectively corresponding to a plurality of users, and
- information defining a group to which each of the plurality of users belongs, the group corresponding to the plurality of destinations;
allow a user of the plurality of users to designate at least one particular group from among a plurality of groups based on attributes of the user's designation as configured by the first information, wherein each group of the plurality of groups corresponds to a respective set of destinations, and the particular group corresponds to a particular set of destinations; and
transmit, in response to the user's designation, image data to the particular set of destinations according to the user's designation.

* * * * *